United States Patent [19]
Aoki et al.

[11] Patent Number: 5,542,754
[45] Date of Patent: Aug. 6, 1996

[54] BRAKE SYSTEM IN ELECTRIC VEHICLE

[75] Inventors: Yasushi Aoki; Ryosuke Fujiya; Iwao Nakamura, all of Saitama, Japan

[73] Assignee: Honda Giken Kogyo Kabushiki Kaisha, Tokyo, Japan

[21] Appl. No.: 407,302

[22] Filed: Mar. 17, 1995

[30] Foreign Application Priority Data

Mar. 17, 1994 [JP] Japan ..................................... 6-046665

[51] Int. Cl.$^6$ ....................................................... B60L 7/24
[52] U.S. Cl. ............................. 303/3; 188/156; 188/159; 303/152; 477/94; 477/188
[58] Field of Search .................................. 180/165, 65.1, 180/65.2, 65.3, 65.4, 65.8; 364/424.1; 192/4 A; 477/20, 9, 188, 15, 40, 94; 303/3, 2, 151, 152; 188/156, 158, 159; 318/375, 376, 139

[56] References Cited

U.S. PATENT DOCUMENTS

| | | | |
|---|---|---|---|
| 5,287,772 | 2/1994 | Aoki et al. | 477/20 |
| 5,326,158 | 7/1994 | Ohori et al. | 188/159 |
| 5,358,317 | 10/1994 | Cikanek | 303/3 X |
| 5,399,000 | 3/1995 | Aoki et al. | 303/3 |
| 5,433,512 | 7/1995 | Aoki et al. | 303/3 |

FOREIGN PATENT DOCUMENTS 5292603  11/1993  Japan .

*Primary Examiner*—Douglas C. Butler
*Attorney, Agent, or Firm*—Lyon & Lyon

[57] ABSTRACT

In an electric vehicle capable of being regeneratively braked, driven wheels connected to and driven by a motor are connected to and capable of being regeneratively braked by a brake control unit. When the regenerative braking of the driven wheels is being conducted by the brake control unit, the gear-shifting of an automatic transmission by a motor/AT control unit is prohibited. Thus, the need for continuance or control of the regenerative braking during gear-shifting is eliminated, thereby preventing a reduction in braking force during the gear-shifting and the generation of a shock.

2 Claims, 12 Drawing Sheets

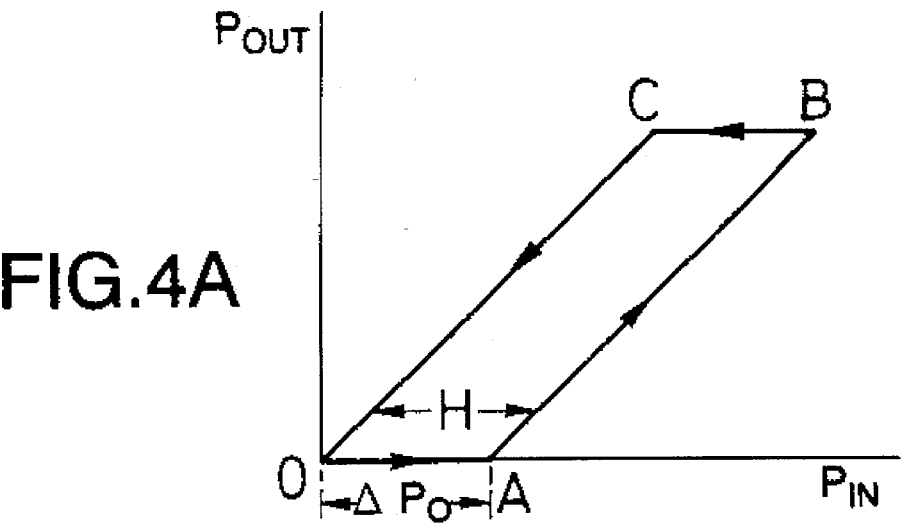
FIG.4A
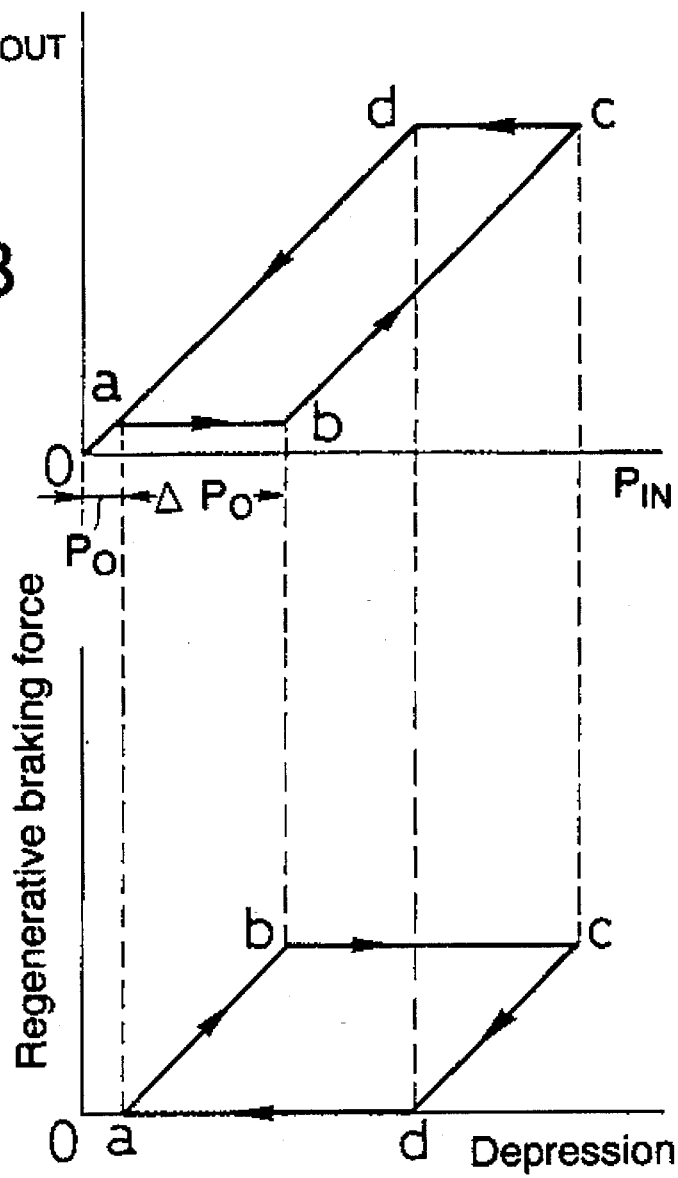
FIG.4B
FIG.4C

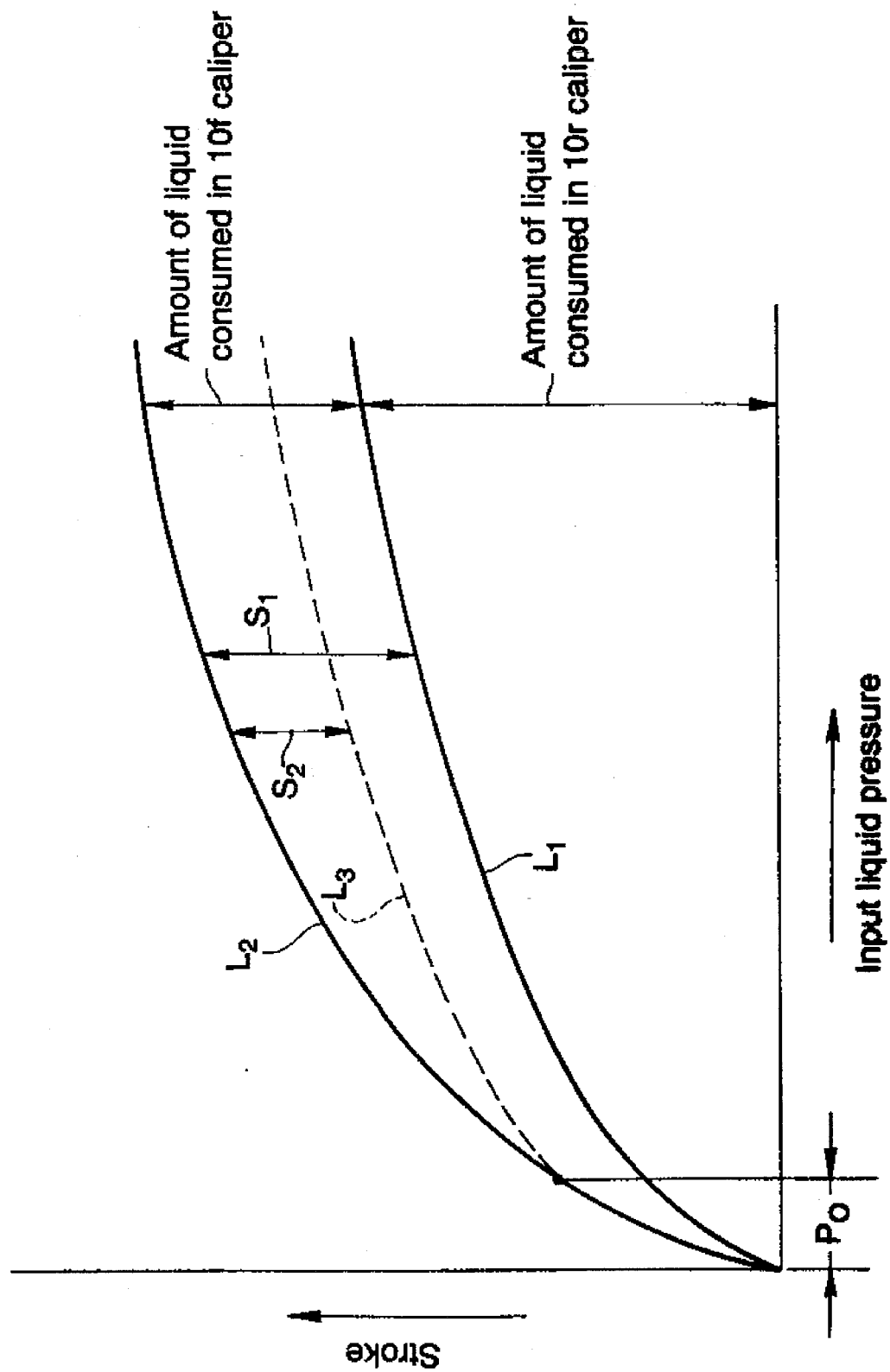

BRAKE SYSTEM IN ELECTRIC VEHICLE

BACKGROUND OF THE INVENTION

1. Field of the Invention

The present invention relates to an electric vehicle including a motor using a battery as an energy source, an automatic transmission interposed between the motor and driven wheels, a gear-shifting control means for controlling the gear shifting of the automatic transmission, and a regenerative braking control means for controlling the regenerative braking of the driven wheels based on a braking operation.

2. Description of the Prior Art

Such an electric vehicle described in Japanese Patent Application Laid-open No. 292603/93 is conventionally known. In that electric vehicle, when a braking operation is carried out during gear shifting of the automatic transmission, only a liquid pressure braking is conducted and a regenerative braking is not conducted, and after completion of the gear shifting, a regenerative braking force is gradually increased, thereby preventing the generation of a shock.

The above prior art vehicle is disadvantageous in that the regenerative braking cannot be conducted during gear shifting and hence, the braking force is decreased during the gear shifting.

Therefore, if the regenerative braking is intended to be conducted to avoid a decrease in braking force, the following problem is encountered. To reduce the gear-shifting shock caused during down-shifting, it is necessary to increase the number of revolutions of the motor after the gear-shifting, compared with that before the gear-shifting, but it is impossible to conduct the regenerative braking while increasing the number of revolutions of the motor. Moreover, the gear-shifting during the regenerative braking is conducted during a speed-reduction and hence, usually this is a down-shifting operation. For this reason, a reduction in braking force due to the absent of the regenerative braking force is frequently produced.

SUMMARY OF THE INVENTION

Accordingly, it is an object of the present invention to prevent a reduction in braking force during gear-shifting in an electric vehicle in which a regenerative braking is performed, and to prevent the generation of a shock during gear-shifting.

To achieve the above object, according to the present invention, there is provided a braking system in an electric vehicle comprising: a motor using a battery as an energy source; an automatic transmission interposed between the motor and driven wheels; a gear-shifting control means for controlling the gear shifting of the automatic transmission; and a regenerative braking control means for controlling the regenerative braking of the driven wheels based on a braking operation, wherein the gear-shifting control means prohibits the gear shifting of the automatic transmission during a regenerative braking based on the braking operation.

With the above arrangement of the present invention, the need for discontinuance of the regenerative braking during the gear-shifting is eliminated, which makes it possible not only to avoid a reduction in braking force, but also to prevent the generation of a shock with the discontinuance of the regenerative braking.

The above and other objects, features and advantages of the invention will become apparent from the following description of the preferred embodiment taken in conjunction with the accompanying drawings.

BRIEF DESCRIPTION OF THE DRAWINGS

FIGS. 4A, 4B and 4C are related graphs illustrating a characteristic of the differential pressure regulating valve and a characteristic of regenerative braking force;

FIG. 6 is a graph illustrating a stroke characteristic of a brake pedal with respect to the input liquid pressure;

DESCRIPTION OF THE PREFERRED EMBODIMENT

The present invention will now be described by way of a preferred embodiment in connection with the accompanying drawings.

Figure 1:
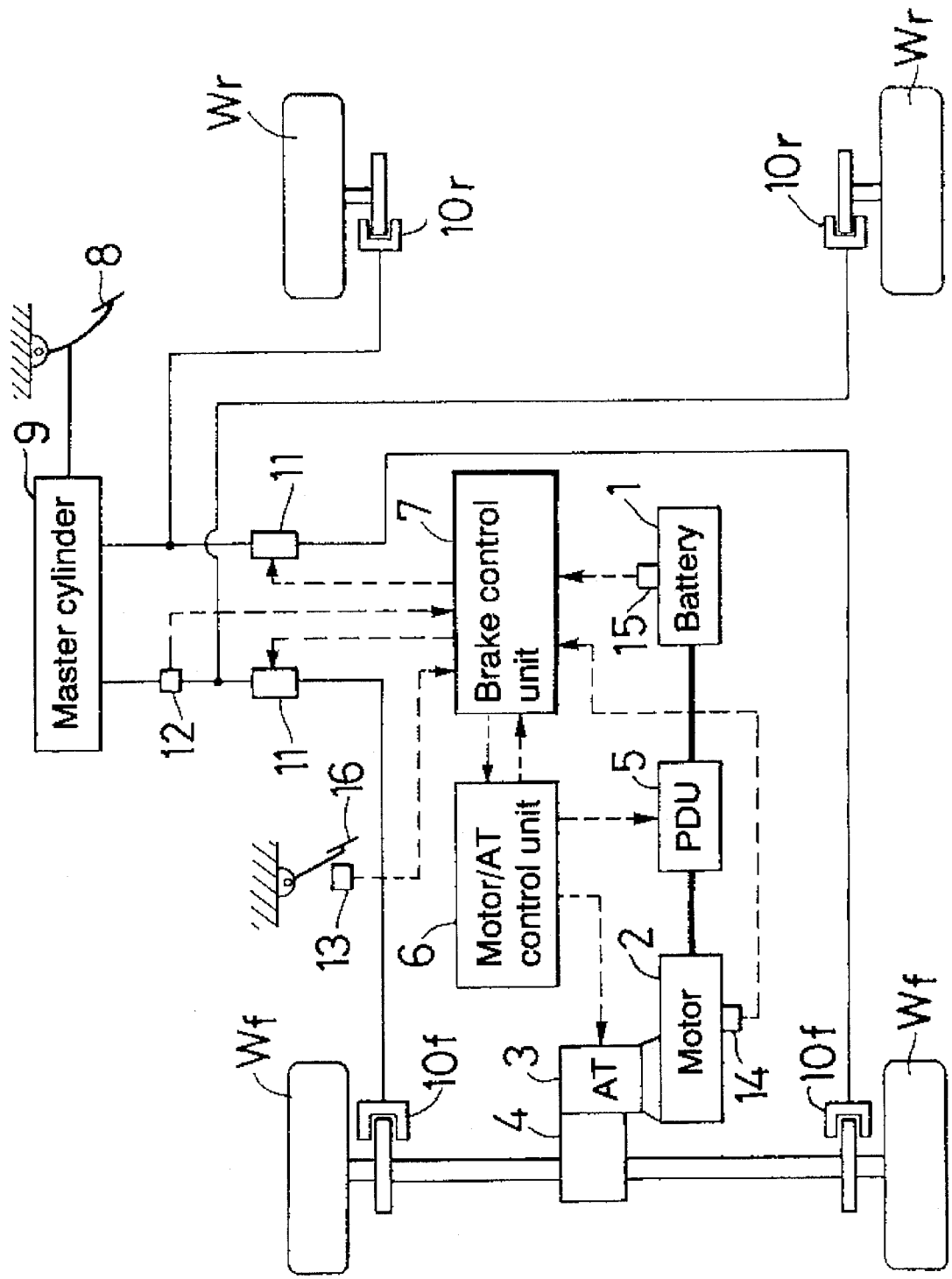
FIG. 1 is a diagrammatic illustration of the entire drive and braking arrangement of an electric vehicle of this invention.

FIGS. 1 to 12 show one embodiment of the present invention. Referring to FIG. 1, there is shown an electric vehicle which is a four-wheel vehicle including a pair of front wheels Wf as driven wheels and a pair of rear wheels Wr as follower wheels. The front wheels Wf are connected through an automatic transmission (AT) 3 and a differential 4 to an electric motor 2 using a battery 1 as an energy source. A power drive unit (PDU) 5 is interposed between the battery 1 and the motor 2 to control the driving of the motor 2 by the battery 1 and to control the charging of the battery 1 by an electric power generated by the motor 2 during regenerative braking. The power drive unit 5 and the automatic transmission 3 are connected to a motor/AT control unit 6 which is connected to a brake control unit 7.

A master cylinder 9 operated by a brake pedal 8 is connected to brake calipers 10f, 10f for the front wheels Wf and brake calipers 10r, 10r for the rear wheels Wr. Differential pressure regulating valves 11, 11 for regulating a master cylinder liquid pressure (an input liquid pressure) $P_{IN}$ from the master cylinder 9 to transmit a predetermined caliper liquid pressure (an output liquid pressure) $P_{OUT}$ to the brake calipers 10f, 10f for the front wheels Wf are incorporated in a liquid pressure circuit connecting the master cylinder 9 and the brake calipers 10f, 10f for the front wheels Wf.

Figure 2:
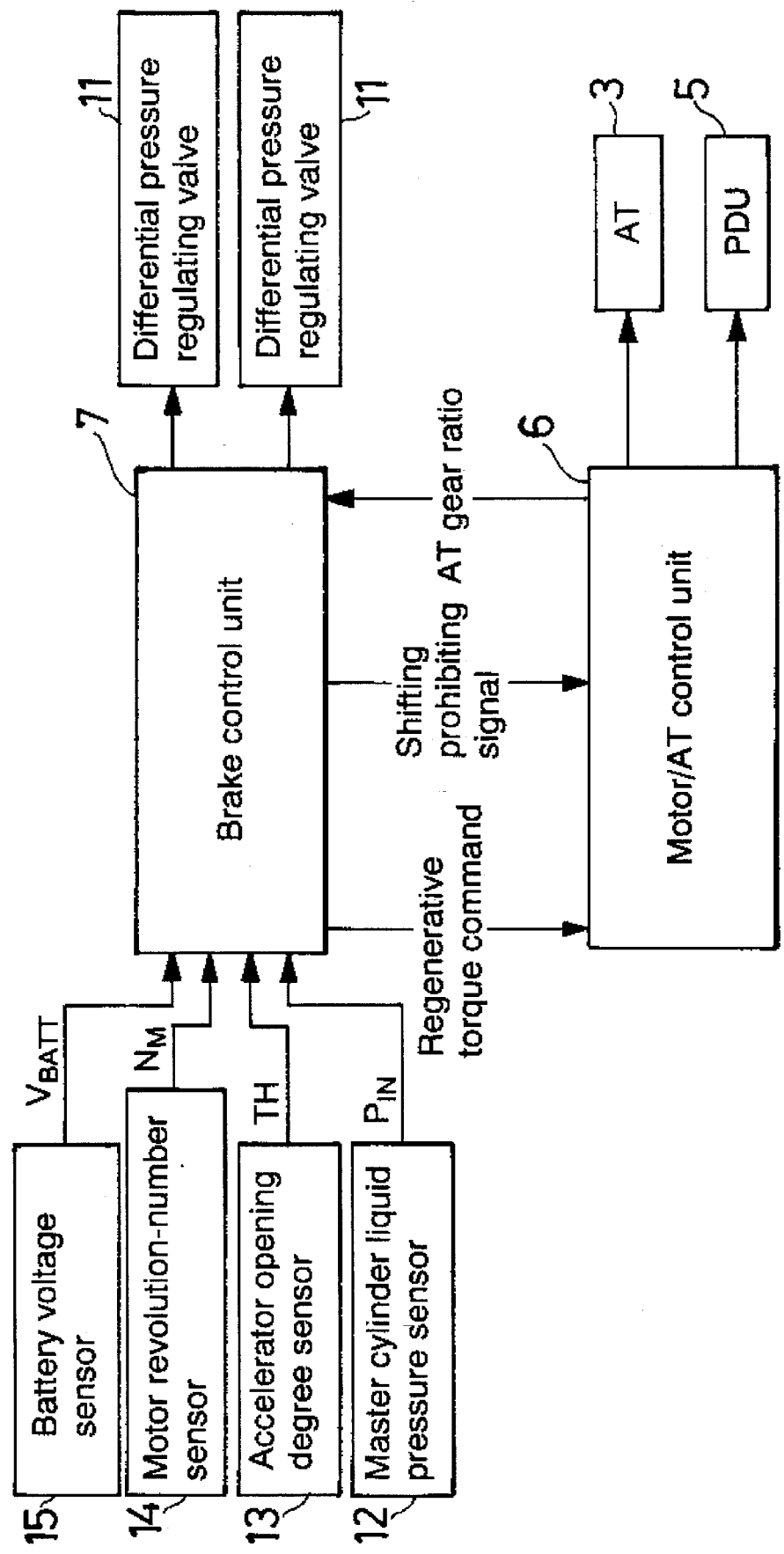
FIG. 2 is a block diagram of a control system of this invention.

As can be seen from FIG. 1 in combination with FIG. 2, connected to the brake control unit 7 are a master cylinder liquid pressure sensor 12 provided in the liquid pressure circuit connected to the master cylinder 9 for detecting a master cylinder liquid pressure $P_{IN}$, an accelerator opening degree sensor 13 provided on an accelerator pedal 16 for detecting an opening degree TH of the accelerator pedal 16, a motor revolution-number sensor 14 provided on the motor 2 for detecting a number $N_M$ of revolutions of the motor, and a battery voltage sensor 15 provided on the battery 1 for detecting a battery voltage $V_{BATT}$. The brake control unit 7 controls the differential pressure regulating valves 11, 11 based on the master cylinder liquid pressure $P_{IN}$, the accelerator opening degree TH, the number $N_M$ of revolutions of the motor, the battery voltage $V_{BATT}$ and a gear ratio of the automatic transmission 3 received from the motor/AT control unit 6.

The motor/AT control unit 6 controls the automatic transmission 3 and the power drive unit 5 based on a regenerative torque command and a shift prohibiting signal received from the brake control unit 7.

Figure 3:
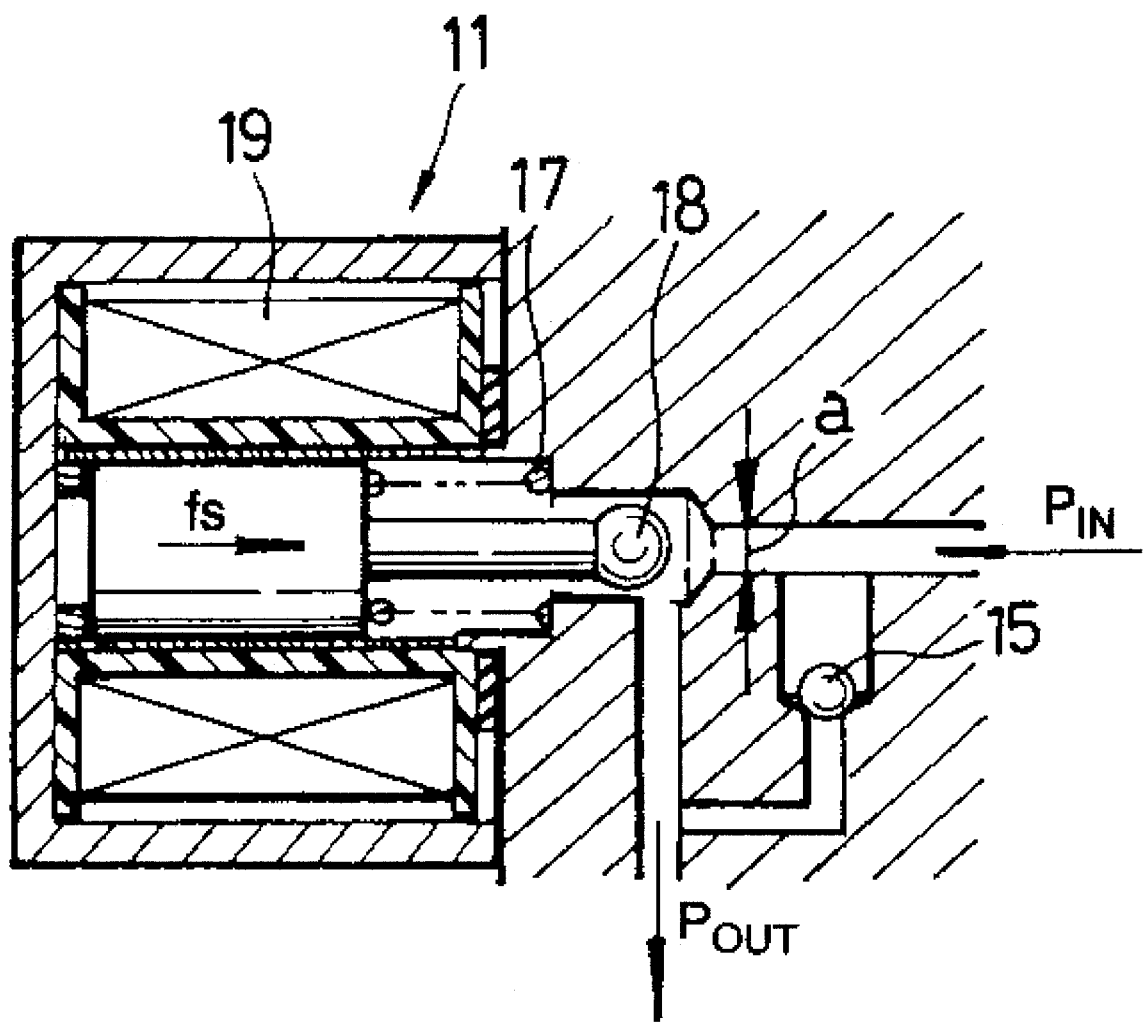
FIG. 3 is a view of the structure of a differential pressure regulating valve.

As shown in FIG. 3, the differential pressure regulating valve 11 includes a valve member 18 biased in a valve-opening direction by a spring 17, a linear solenoid 19 for adjusting a preset load of the spring 17 and a one-way valve 15 for limiting the transfer of a liquid pressure from the master cylinder 9 toward the brake cylinder 10$f$.

By the differential pressure regulating valve 11, the master cylinder liquid pressure (the input liquid pressure) $P_{IN}$ and the caliper liquid pressure (the output liquid pressure) $P_{OUT}$ are equal to each other in a deenergized state of the linear solenoid 19, but an input/output characteristic having a hysteresis as shown by O→A→B→C→O in FIG. 4A can be obtained in a condition in which the linear solenoid 19 is energized to bias the valve member 18 by a biasing force fs.

While the input liquid pressure $P_{IN}$ is being increased from a 0 point to an A point, the output liquid pressure $P_{OUT}$ is zero. If the valve member 18 is opened at the A point, the output liquid pressure $P_{OUT}$ is increased with an increase in input liquid pressure $P_{IN}$ in a relationship represented by a following expression:

$$P_{OUT}=P_{IN}-fs/a$$

wherein a is the sectional area of an input port in the differential pressure regulating valve 11. Even if the input liquid pressure $P_{IN}$ is decreased at a B point, the valve member 18 is maintained at its closed state, so that the output liquid pressure $P_{OUT}$ is not immediately decreased, and the output liquid pressure $P_{OUT}$ is kept constant up to a C point at which it becomes equal to the input liquid pressure $P_{IN}$. If the input liquid pressure $P_{IN}$ starts to drop further at the C point, the one-way valve 15 is opened at the C point and the output and input liquid pressures $P_{OUT}$ and $P_{IN}$ are equalized to each other, whereupon the output liquid pressure $P_{OUT}$ is decreased to the 0 point while keeping a relationship of $P_{OUT}=P_{IN}$. At this time, a hysteresis H during increasing and decreasing of the pressure is determined according to a following expression:

$$H=fs/a$$

A difference in input liquid pressure $P_{IN}$ between the 0 and A points, i.e., an amount $\Delta P_0$ due to operation of the differential pressure regulating valve 11 is equal to the hysteresis H and can be set at any value by controlling the electric current flowing across the linear solenoid 19.

Therefore, when the regenerative braking of the front wheels Wf is not carried out, the differential pressure regulating valves 11, 11 are deenergized and maintained in their opened states, thereby causing the input liquid pressure $P_{IN}$ to be transferred as the output liquid pressure $P_{OUT}$ to the brake calipers 10$f$, 10$f$ for the front wheels Wf. As a result, as the depression force on the brake pedal 8 is increased, both the braking force Fr of the brake calipers 10$f$, 10$f$ for the front wheels Wf and the braking force Rr of the brake calipers 10$r$, 10$r$ for the rear wheels Wr are increased linearly (see FIG. 5A).

Figure 5A:
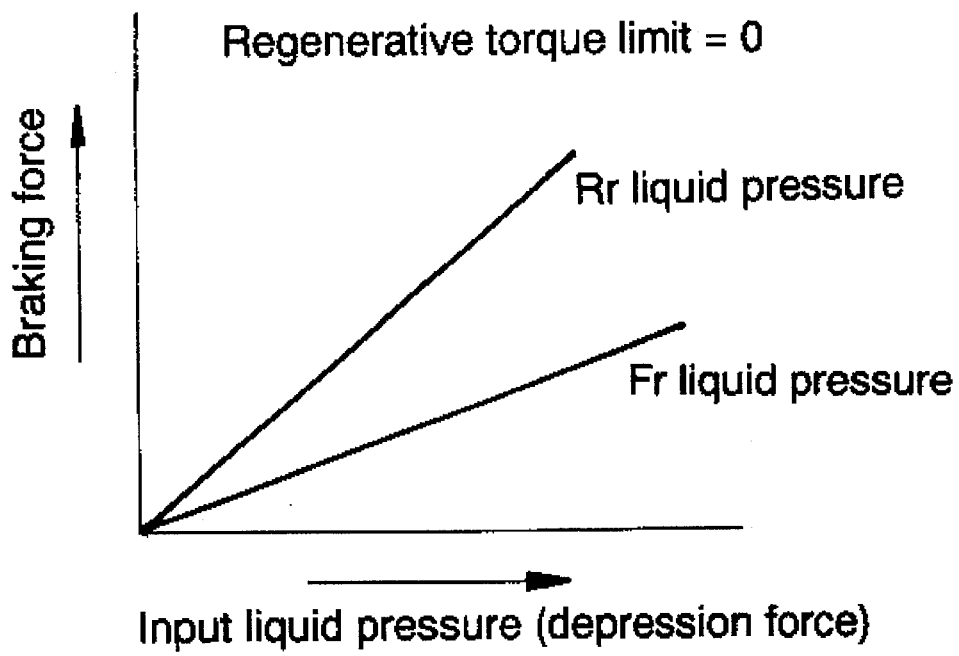
FIGS. 5A and 5B are graphs illustrating a characteristic of distribution of the liquid pressure braking force and the regenerative braking force with respect to the input liquid pressure.
Figure 5B:
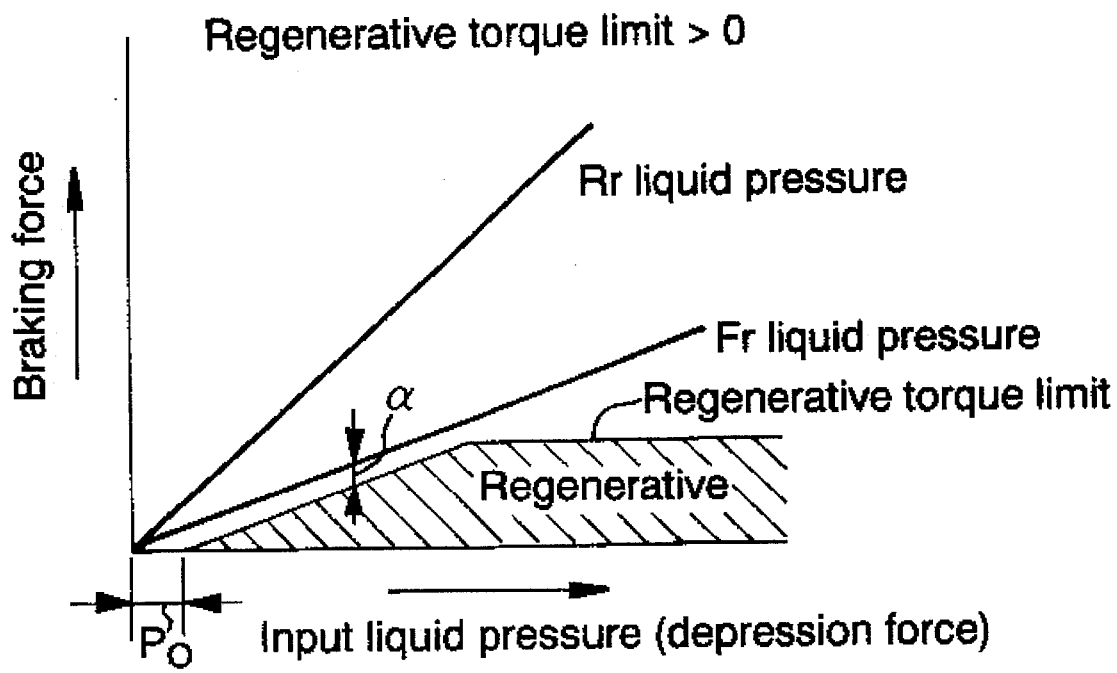

On the other hand, when the regenerative braking of the front wheels Wf is carried out, the differential pressure regulating valves 11, 11 are energized to vary the characteristic of the output liquid pressure $P_{OUT}$ relative to the input liquid pressure $P_{IN}$, thereby partially limiting the braking force Fr of the brake calipers for the front wheels Wf, and the limited braking force is compensated for by the regenerative braking of the front wheels Wf, thereby making it possible to provide a braking force for the front wheels Wf corresponding to the depression force on the brake pedal 8 in total (see FIG. 5B).

The general description has been made in order to facilitate the understanding of the present invention, but in practice, in the present embodiment, in carrying out the regenerative braking, the differential pressure regulating valves 11, 11 are controlled to vary the characteristic of the output liquid pressure $P_{OUT}$ t relative to the input liquid pressure $P_{IN}$ in a manner as shown in FIG. 4B.

More specifically, at an initial stage when the brake pedal 8 has been started to be depressed, the differential pressure regulating valves 11, 11 are not energized and maintained in their opened state until the input liquid pressure $P_{IN}$ reaches a predetermined value $P_0$. From the 0 point to an a point, the input liquid pressure is transferred as the output liquid pressure as it is. When the input liquid pressure has reached the predetermined value $P_0$, an input/output characteristic as shown by 0→a→b→c→d→e is provided by energizing the differential pressure regulating valves 11, 11 as in FIG. 4A. Therefore, at the initial stage when a driver of the vehicle starts depressing the brake pedal 8, the regenerative braking is not carried out, and the input liquid pressure $P_{IN}$ is transferred as the output liquid pressure as it is, to the brake calipers 10$f$, 10$f$ for the front wheels Wf to effect a liquid pressure braking. After the input liquid pressure $P_{IN}$ has reached the predetermined value $P_0$, the output liquid pressure $P_{OUT}$ is cut off by the differential pressure regulating valves 11, 11 to limit the liquid pressure braking force Fr for the front wheels Wf, and the decrement is compensated for by the regenerative braking of the front wheels Wf.

As described above, when both the liquid pressure braking force and the regenerative braking force are used, the ratio of the liquid pressure braking force to the regenerative braking force is varied in the course in which the depression force on the brake pedal 8 is increased or decreased. Therefore, in order to ensure that the sum total of both the braking forces is not suddenly varied, it is necessary to control the magnitude of the regenerative braking force as shown in FIG. 4C.

That is, in a range from the 0 point to the a point in which the output liquid pressure $P_{OUT}$ (i.e., the liquid pressure braking force) is increased with respect to the input liquid pressure $P_{IN}$ (i.e., the depression force), the regenerative braking force is maintained at zero. In a range of from the a point to the b point in which even if the input liquid pressure $P_{IN}$ is increased, the output liquid pressure $P_{OUT}$ is not increased, but rather the regenerative braking force is increased with an increase in the depression force. In a range of from b point to c point in which the output liquid pressure $P_{OUT}$ is increased with an increase in the input liquid pressure $P_{IN}$, the increasing of the regenerative braking force is suppressed. In a range of from the c point to the d point in which even if the input liquid pressure $P_{IN}$ is decreased, the output liquid pressure $P_{OUT}$ is not decreased, the regenerative braking force is decreased with a decrease in the depression force. In a range of from the d point to 0 point in which the output liquid pressure $P_{OUT}$ is decreased with a decrease in the input liquid pressure $P_{IN}$, it is necessary to maintain the regenerative braking force at zero.

Thus, a characteristic of distribution of the liquid pressure braking force Fr and the regenerative braking force in the front wheels Wf is as shown in FIG. 5B, and the regenerative braking can be preferentially performed to effectively recover energy. After the regenerative braking force has reached a limit, the liquid pressure braking force Fr can be added to insure a required total braking force.

The variation in stroke of the brake pedal upon depression of the brake pedal 8 now will be described below.

In general, when the brake calipers are operated by a liquid pressure generated by the master cylinder by depression of the brake pedal, the amount of liquid consumed at an initial stage of braking is increased due to the play in each of the brake calipers. As the play is eliminated, thereby causing the braking force to be increased, the increase in the amount of liquid consumed is reduced.

Therefore, the amount of stroke of the brake pedal 8 required due to such liquid consumed in the brake calipers 10r, 10r for the rear wheels Wr is increased at the initial stage of braking as shown by a line $L_1$ in FIG. 6 with an increase in the input liquid pressure $P_{IN}$. At this time, when the differential pressure regulating valves 11, 11 have been energized to close the liquid pressure circuit, the amount of liquid consumed in the brake calipers 10r, 10r for the front wheels Wf is zero and hence, the stroke of the brake pedal 8 is varied along the line $L_1$. On the other hand, when the differential pressure regulating valves 11, 11 have been deenergized to open the liquid pressure circuit, the amount of liquid consumed in the brake calipers 10r, 10r for the front wheels Wf is largest and hence, the stroke of the brake pedal 8 is varied along a line $L_2$.

On the other hand, until the input liquid pressure $P_{IN}$ is gradually increased from zero to reach the predetermined value $P_0$, the differential pressure regulating valves 11, 11 are maintained in their deenergized states to open the liquid pressure circuit, and if the differential pressure regulating valves 11, 11 are energized to close the liquid pressure circuit when the input liquid pressure $P_{IN}$ has reached the predetermined value $P_0$, the stroke of the brake pedal 8 is varied along a line $L_3$.

Therefore, when the differential pressure regulating valves 11, 11 are changed from their energized states to their deenergized states to open the liquid pressure circuit in order to switch over the regenerative braking to the liquid pressure braking, a large change in the stroke shown by $S_1$ in FIG. 6 is produced to make the braking feeling uncomfortable, if the characteristic of the differential pressure regulating valves 11, 11 is controlled as shown in FIG. 4A. Therefore, if the characteristic of the differential pressure regulating valves 11, 11 is controlled as shown in FIG. 4B as in the present embodiment, only a small change in the stroke shown by $S_2$ in FIG. 6 is produced, which makes it possible to improve the braking feeling.

As described above, at the initial stage of braking in which the amount of liquid consumed in the brake calipers 10f, 10f is larger, the liquid pressure braking is temporarily carried out, and the stroke due to the play of the brake calipers 10f, 10f is absorbed, thereby making it possible to minimize the change in the stroke of the brake pedal 8, when the regenerative braking is switched over to the liquid pressure braking.

The start of the regenerative braking is delayed by temporarily using the liquid pressure braking at the initial stage of braking, so that the regenerative braking force is decreased by an amount shown by $\alpha$ in FIG. 5B, resulting in a reduced rate of recovery of the energy. But such a decrement is extremely small and hence, is substantially unimportant.

The above-described operation will be further described with reference to flow charts and graphs.

Figure 7:
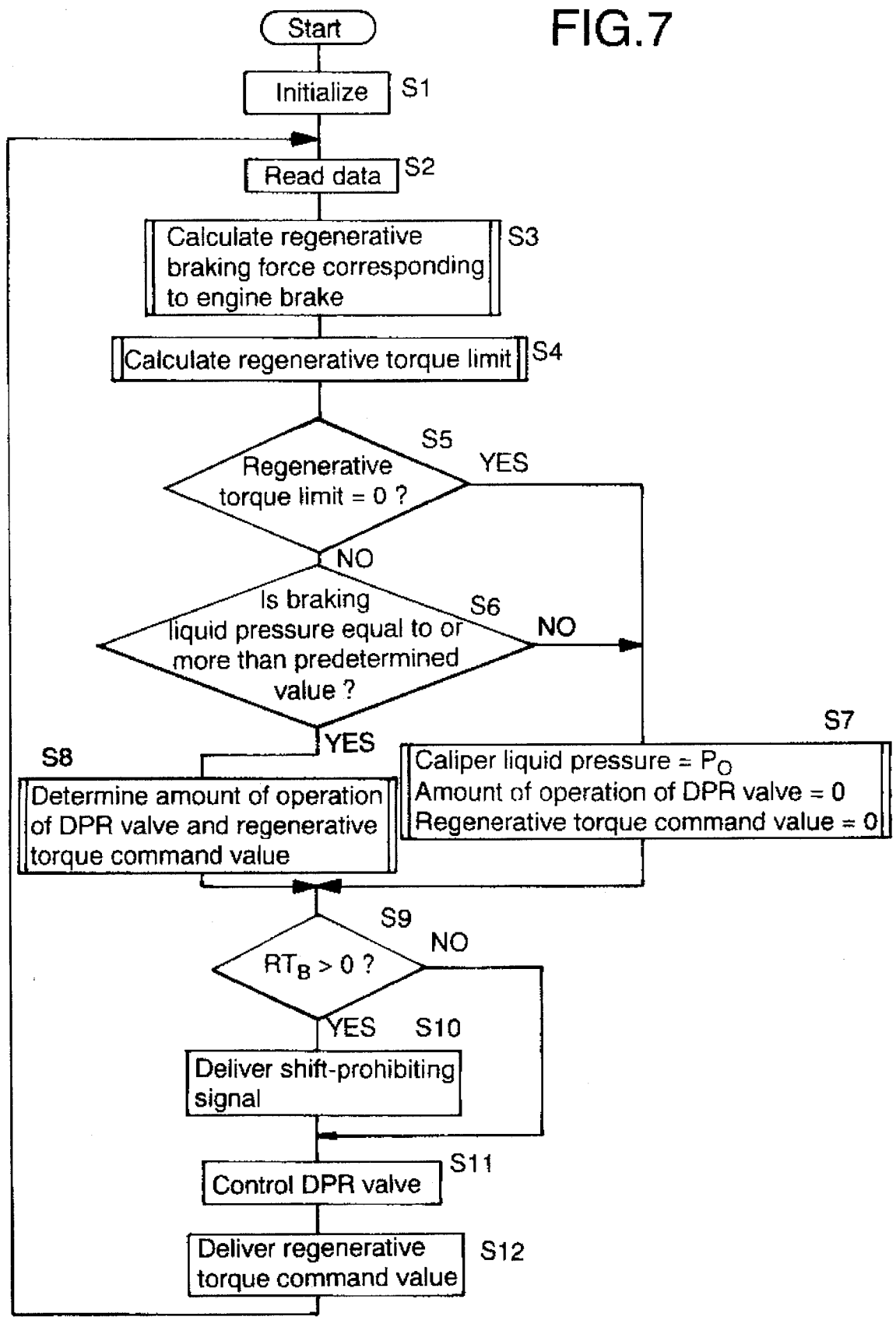
FIG. 7 is a flow chart of a main routine.

First, at step S1 in the flow chart of a main routine shown in FIG. 7, the motor/AT control unit 6 and the brake control unit 7 are initialized in their operable states. At this time, an initial value of the output liquid pressure $P_{OUT}$ is set at the predetermined value $P_0$ shown in FIG. 4B. Then, at step S2, the master cylinder liquid pressure $P_{IN}$ from the master cylinder liquid pressure sensor 12, the accelerator opening degree TH from the accelerator opening degree sensor 13, the number $N_M$ of revolutions of the motor from the motor revolution-number sensor 14 and the battery voltage $V_{BATT}$ from the battery voltage sensor 15 are read in the brake control unit 7 (see FIG. 2).

Figure 8:
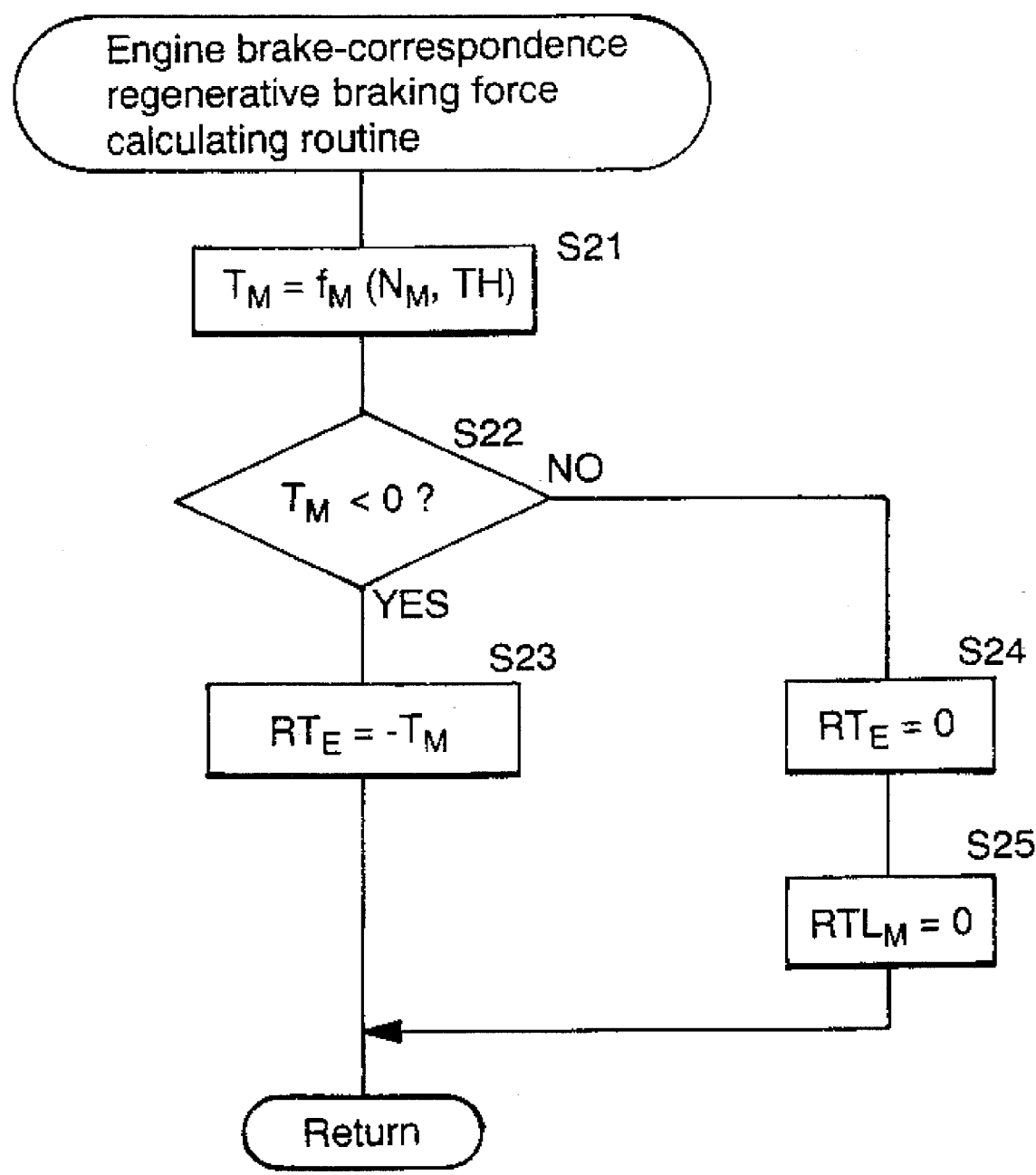
FIG. 8 is a flow chart of a subroutine of step S3 in the main routine.

At step S3, the calculation of a force $RT_E$ of a regenerative braking corresponding to an engine brake of a vehicle using an internal combustion engine as a drive source is carried out by an engine brake-correspondence regenerative braking force calculating routine (see FIG. 8).

Figure 10:
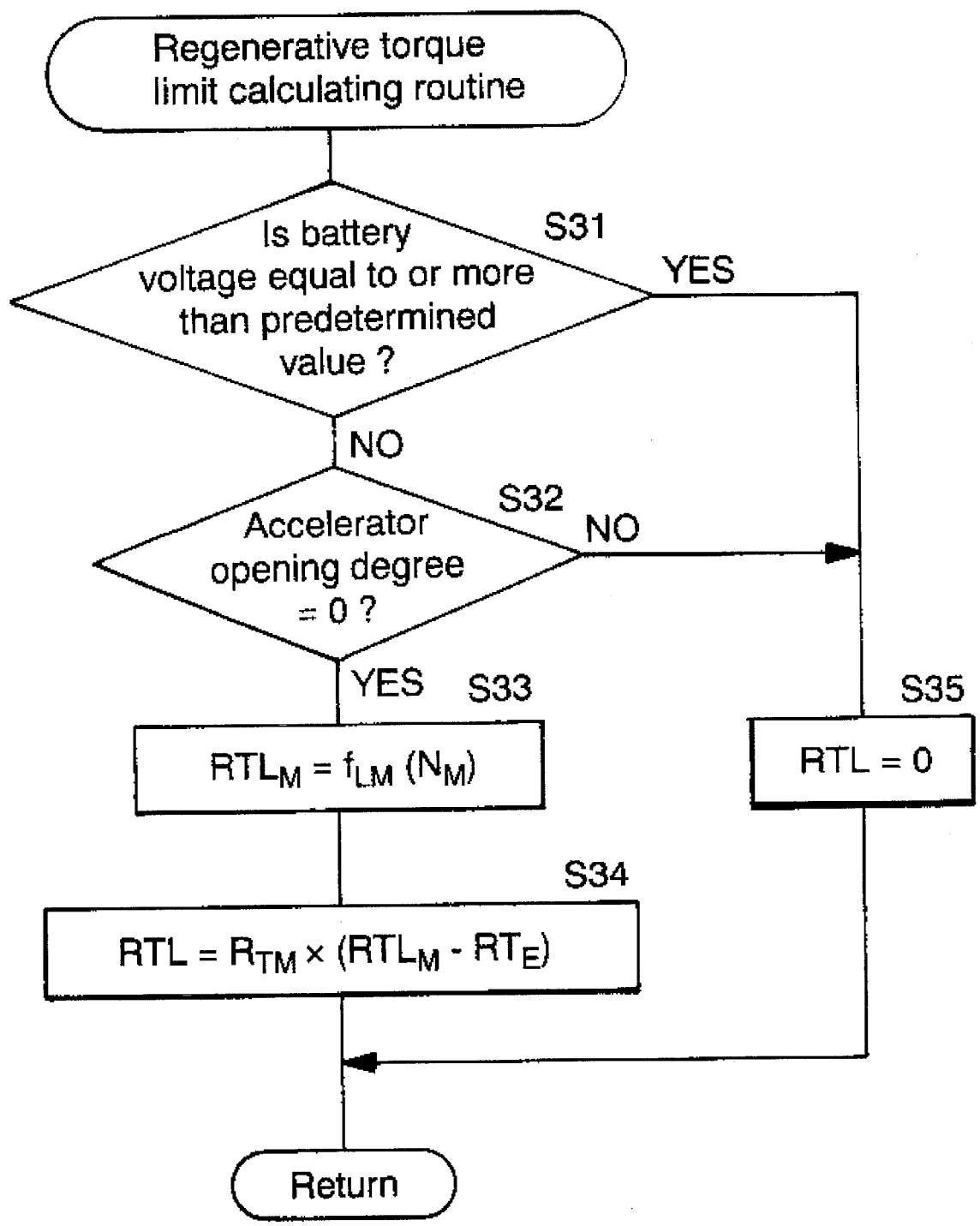
FIG. 10 is a flow chart of a subroutine of step S4 in the main routine.

At step S4, a torque RTL which is usable during a braking operation and which is a limit value of regenerative braking force exhibitable at every moment, is calculated by a regenerative torque limit calculating routine (see FIG. 10).

If the value of regenerative torque limit (the torque RTL usable during the braking operation) is determined to be zero at step S5 then the regenerative braking cannot be conducted, or if the braking liquid pressure does not reach the predetermined value $P_0$ at step S6 (i.e., in a range of the 0 point to the a point in FIG. 4B corresponding to immediately after the start of depression of the brake pedal 8) even if the regenerative torque limit value is not zero at step S5, the caliper liquid pressure ($P_{OUT}$) is set at the predetermined value $P_0$; the amount ($\Delta P_0$) of operation of the differential pressure regulating valve (DPR valve) 11 is set at zero and the regenerative torque command value (RT) is set at zero at step S7 in order to prohibit regenerative braking and to carry out liquid pressure braking.

On the other hand, if the regenerative torque limit value is not zero at step S5 and the braking liquid pressure reaches the predetermined value $P_0$ at step S6, an amount of operation of the differential pressure regulating valve for determining a liquid pressure braking force for the front wheels Wf is determined and a regenerative torque command value for determining a regenerative braking force for the front wheels Wf is determined at step S8.

At step S9, a value of a regenerative torque $RT_B$ (which will be described hereinafter) corresponding to a brake operation amount calculated at step S8 is compared with zero. If $RT_B > 0$, a shift prohibiting signal is delivered from the brake control unit 7 to the motor-AT control unit 6 at step S10, thereby prohibiting gear-shifting of the automatic transmission 3.

When the value of the regenerative torque $RT_B$ corresponding to the brake operation amount is zero or more and the regenerative braking of the front wheels Wf is carried out, the gear-shifting of the transmission 3 is prohibited. In other words, when the gear-shifting of the transmission 3 is carried out, the regenerative braking of the front wheels Wf is not carried out. Therefore, it is unnecessary to discontinue the regenerative braking during gear-shifting. This prevents a reduction in braking force during gear-shifting, but also prevents the generation of a shock.

Then, the liquid pressure braking of the front wheels Wf is performed by a predetermined braking force by controlling the differential pressure regulating valves 11, 11 at step S11, and the regenerative braking of the front wheels Wf is performed by the delivery of the regeneration command value at step S12.

Figure 9:
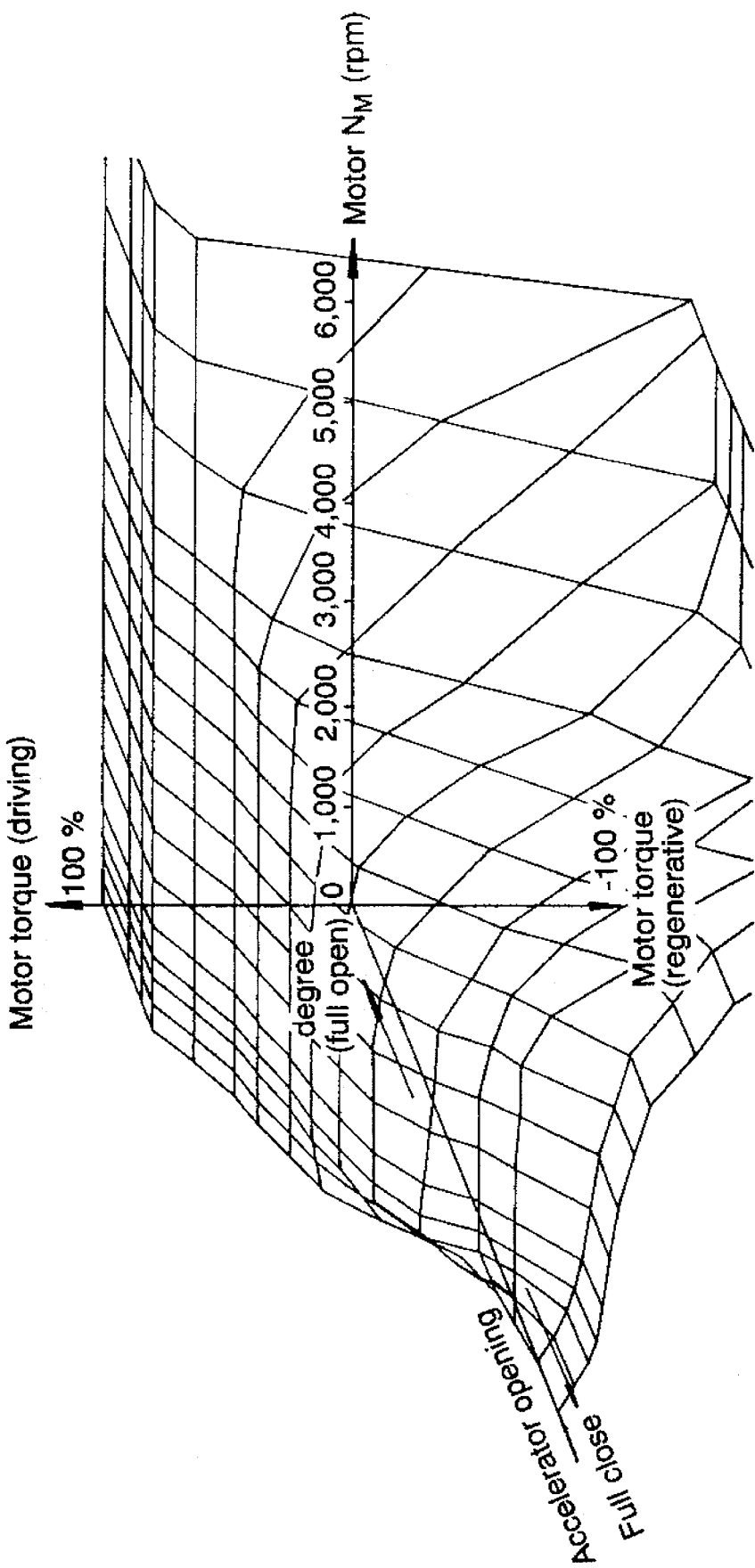
FIG. 9 is a map for determining a motor torque.

The specific contents of the engine brake-correspondence regenerative braking force calculating routine will be described with reference to the subroutine of the flow chart of FIG. 8 and the map shown in FIG. 9.

First, at step S21, a motor torque $T_M$ is determined based on the motor revolution number $N_M$ and the accelerator opening degree TH. FIG. 9 illustrates the map for determining the motor torque $T_M$. When the motor revolution number $N_M$ and the accelerator opening degree TH have been determined, a motor torque $T_M$ corresponding to them is provided as a function $f_M(N_M, TH)$. The value of the motor torque $T_M$ becomes a driving torque when it is located above the origin of the axis of ordinates, whereas the value of the motor torque $T_M$ becomes a regenerative torque when it is located below the origin of the axis of ordinates in FIG. 9.

Then, at step S22, it is judged whether the motor torque $T_M$ determined at step S21 is plus or minus. If the motor torque $T_M$ is minus and the regenerative braking is to be carried out, the engine brake-correspondence regenerative braking force $RT_E$ is set at $-T_M$ at step S23. On the other hand, if the motor torque $T_M$ is not minus at step S22 and a usual driving is being carried out, the engine brake-correspondence regenerative braking force $RT_E$ is set at zero at step S24, and the motor-generatable torque $RTL_M$ corresponding to an axle torque is set at zero at step S25.

The specific contents of the regenerative torque limit calculating routine at the step S4 in the flow chart shown in FIG. 7 will be described with reference to a flow chart shown in FIG. 10 and a map shown in FIG. 11.

First, it is judged at step S31 whether the battery voltage $V_{BATT}$ detected by the battery voltage sensor 15 is equal to or more than a predetermined value. If the battery voltage $V_{BATT}$ is equal to or more than the predetermined value, it is not required to carry out the regenerative braking and hence, the torque RTL usable during the braking operation is set at zero at step S35.

If the battery voltage $V_{BATT}$ is determined in step S31 to be less than the predetermined amount, then it is judged at step S32 whether or not the accelerator opening degree TH detected by the accelerator opening degree sensor 13 is zero. If the accelerator opening degree TH is not zero, i.e., if the motor 2 is being driven, the regenerative braking is not carried out and hence, the torque usable during the braking operation is set at zero at step S35.

Figure 11:
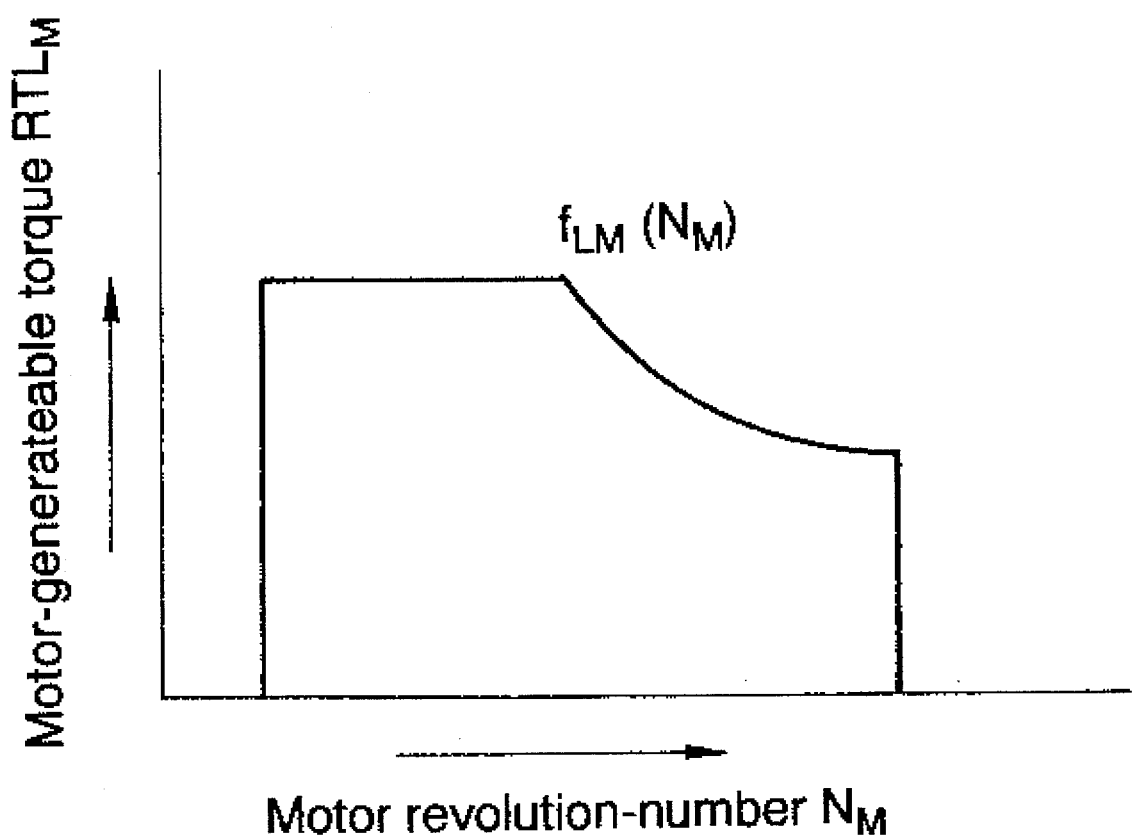
FIG. 11 is a map for determining a motor-generatable torque.

If the battery voltage $V_{BATT}$ is lower than the predetermined value at step S31 and the accelerator opening degree TH is zero at step S32, a motor-generatable torque $RTL_M$ generatable by the motor 2 is determined from the map shown in FIG. 11 based on the motor revolution number $N_M$ detected by the motor revolution-number sensor 14.

Then, a torque RTL usable during the braking operation is calculated at step S34 by multiplying the difference between the motor-generatable torque $RTL_M$ and the engine brake-correspondence regenerative braking force $RT_E$ by a gear ratio $R_{TM}$.

Figure 12:
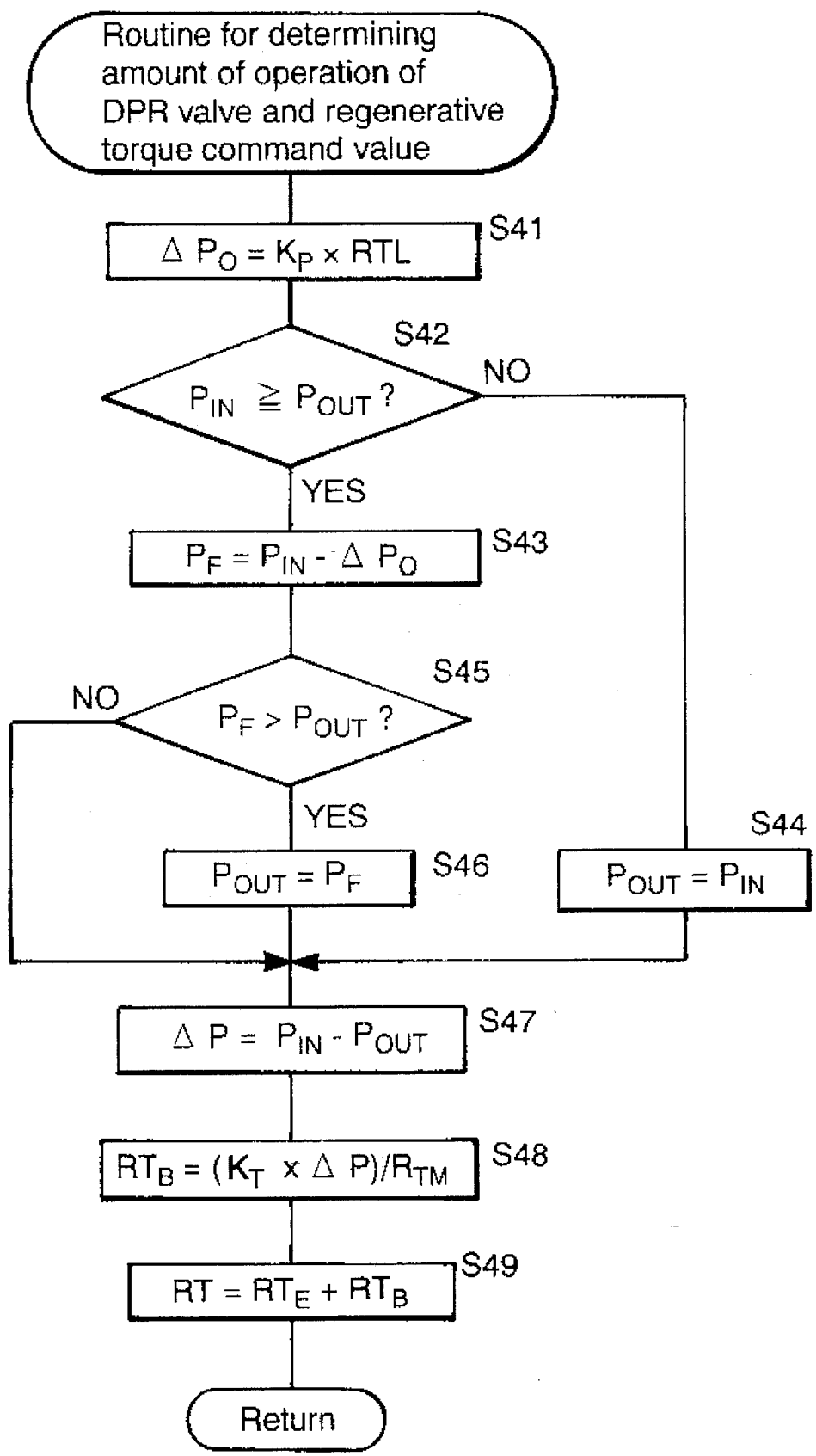
FIG. 12 is a flow chart of a subroutine of step S8 in the main routine.

The specific contents of a routine for determining the amount of operation of the differential pressure regulating valve and a regenerative torque will be described below with reference to a flow chart shown in FIG. 12.

First, at step S41, an amount $\Delta P_0$ of operation of the differential pressure regulating valve is calculated by multiplying the torque RTL usable during the braking operation, which has been determined in the regenerative torque limit calculating routine shown in FIG. 10, by a torque-liquid pressure converting constant $K_P$.

Then, because the output liquid pressure $P_{OUT}$ has been previously initialized at the predetermined value $P_0$ ($P_{OUT}=P_0$) at step S1, the input liquid pressure $P_{IN}$ is determined to be equal to or more than $P_{OUT}$ at step S42 when it has exceeded the predetermined value $P_0$ as a result of depression of the brake pedal 8, thereby proceeding to step S43. At step S43, $P_F$ is calculated according to an expression of $P_F = P_{IN} - \Delta P_0$, and at step S45, $P_F$ is compared with $P_{OUT}$. In the range of from the a point to the point shown in FIG. 4B, the value of $P_F$ is equal to or less than $P_{OUT}$ and hence, the answer at step S45 is NO, proceeding to step S47.

At step S47, a differential pressure $\Delta P$ is calculated according to an expression of $P_{IN} - P_{OUT}$. At this time, $P_{OUT} = P_0$ in the range of from the a point to the b point and therefore, the differential pressure $\Delta P$ is equal to $P_{IN} - P_{OUT}$.

If the brake pedal 8 is further depressed to enter the range of from the b point to the c point, $P_F P_{OUT}$ and hence, the answer at step S45 is YES, proceeding to step S46, at which $P_{OUT}$ is substituted with $P_F$ calculated at step S43. Thus, the differential pressure $\Delta P$ is equal to $\Delta P_0$ (a constant value) at step S47.

If the range from the c point to the d point in which the depression force on the brake pedal 8, i.e., $P_{IN}$ is reduced has been entered, the answer at step S45 becomes NO, proceeding to step S47. At that time, the differential pressure $P\Delta$ is reduced to zero in the range from the c point to the d point.

If the depressing force of the brake pedal 8 is further decreased and the range from the d point to the 0 point has been entered, the answer at step S42 becomes NO, proceeding to step S44, at which the value of $P_{OUT}$ is substituted with $P_{IN}$. This causes the differential pressure $\Delta P$ to become zero at step S47.

When the differential pressure $\Delta P$ between the input and output liquid pressures $P_{IN}$ and $P_{OUT}$ has been determined in the above manner, a regenerative torque $RT_B$ corresponding to the brake operation amount is determined at step S48 from the differential pressure $\Delta P$, the liquid pressure-torque converting constant $K_T$ and the gear ratio $R_{TM}$. A regenerative torque command value RT is determined at step S49 by adding the engine brake-correspondence regenerative braking force $RT_E$ to the regenerative torque $RT_B$ corresponding to the brake operation amount.

Thus, the liquid pressure braking force is controlled by operating the differential pressure regulating valves 11, 11 based on the amount of operation of the differential pressure regulating valves determined at step S41. The regenerative braking force is controlled based on the regenerative torque command value RT determined at step S49.

Although the embodiment of the present invention has been described in detail, it will understood that the present invention is not limited to the above-described embodiment, and various modifications in design may be made without departing from the spirit and scope of the invention defined in claims.

For example, although the vehicle including the front wheels Wf as the driven wheels and the rear wheels Wr as the follower wheels has been exemplified in the embodiment, the present invention is also applicable to a vehicle including front wheels Wf as follower wheels and rear wheels as driven wheels. In addition, in place of the indirect detection of the amount of operation of the brake pedal 8 by the master cylinder liquid pressure sensor 12, the amount of operation of the brake pedal 8 may be directly detected by a stroke sensor or the like.

What is claimed is:

1. A braking system in an electric vehicle comprising:
   a motor for driving said electric vehicle, said motor using a battery as an energy source;
   an automatic transmission interposed between the motor and driven wheels;
   a gear-shifting control means for controlling gear shifting of the automatic transmission; and
   a regenerative braking control means for controlling regenerative braking of the driven wheels by said motor through said automatic transmission based on a braking operation of the braking system; wherein
   said gear-shifting control means having means responsive to said regenerative braking control means for prohibiting the gear shifting of said automatic transmission during said regenerative braking based on said braking operation.

2. A braking system in an electric vehicle having an electric motor for driving said electric vehicle, said motor using a battery as an energy source and a multi-speed automatic transmission interposed between the electric motor and drive wheels, and a regenerative braking control for causing regenerative braking of the drive wheels by the motor through the transmission upon a braking operation of the braking system, an improvement comprising,
   a gear-shifting control means responsive to the regenerative braking control for prohibiting down-shift gear shifting of the automatic transmission during the regenerative braking of the driven wheels based on the braking operation.

* * * * *